(No Model.) 3 Sheets—Sheet 1.
C. W. KENNEDY.
STORAGE BATTERY.
No. 507,139. Patented Oct. 24, 1893.
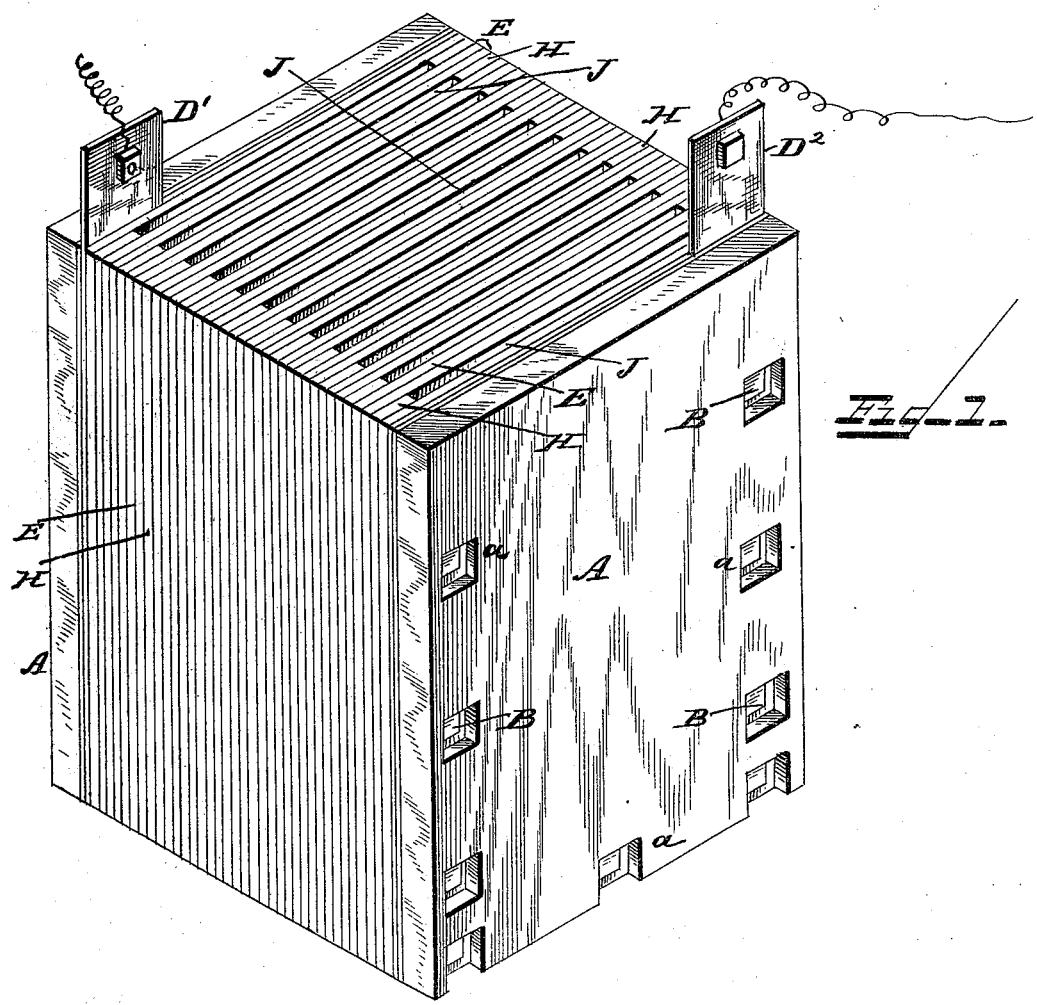
WITNESSES:
INVENTOR:
Charles W. Kennedy
by Louis Bagger & Co.
his Attorneys.

(No Model.) 3 Sheets—Sheet 2.
C. W. KENNEDY.
STORAGE BATTERY.
No. 507,139. Patented Oct. 24, 1893.
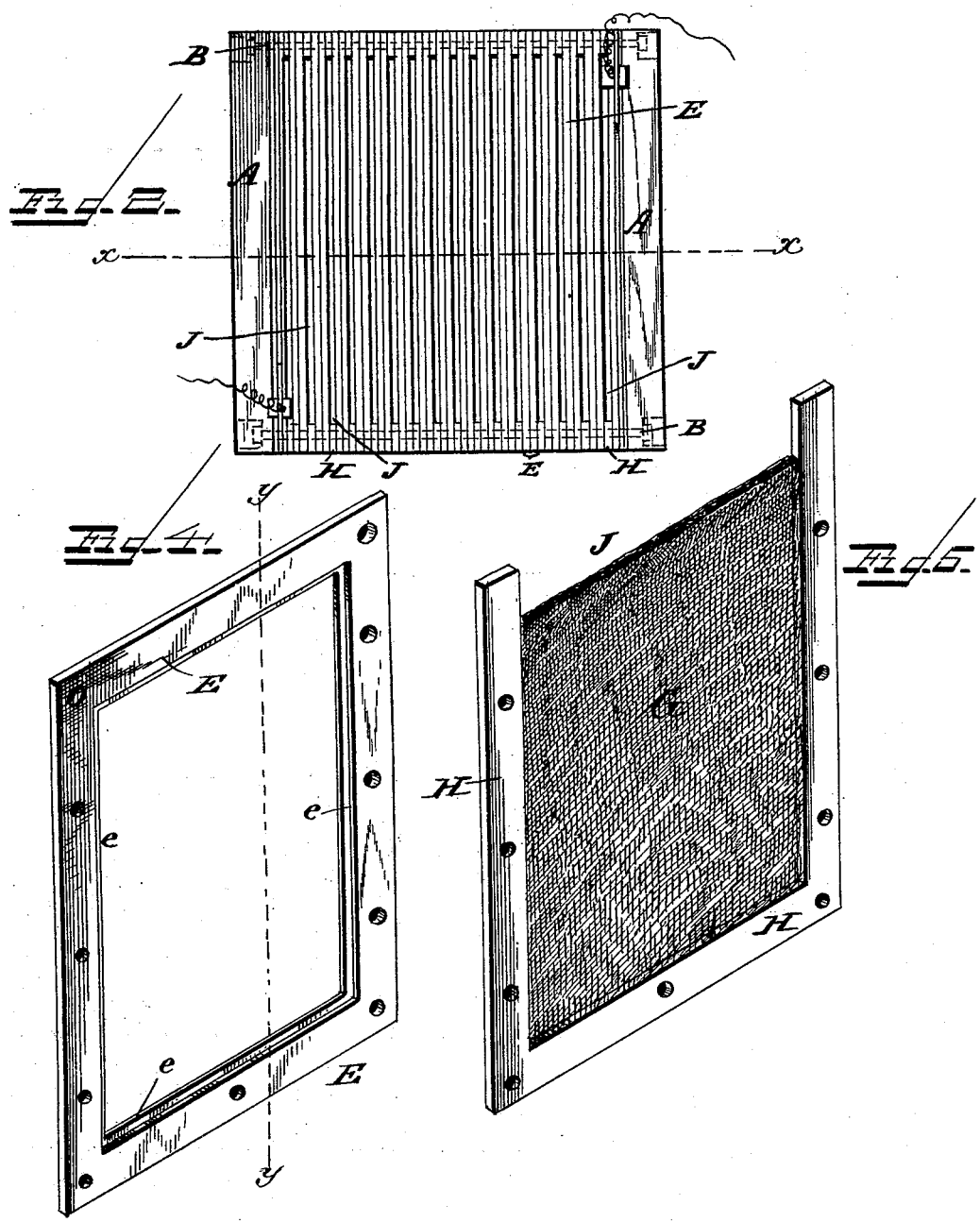
WITNESSES:
INVENTOR:
Charles W. Kennedy
by Louis Bagger & Co.
his Attorneys.

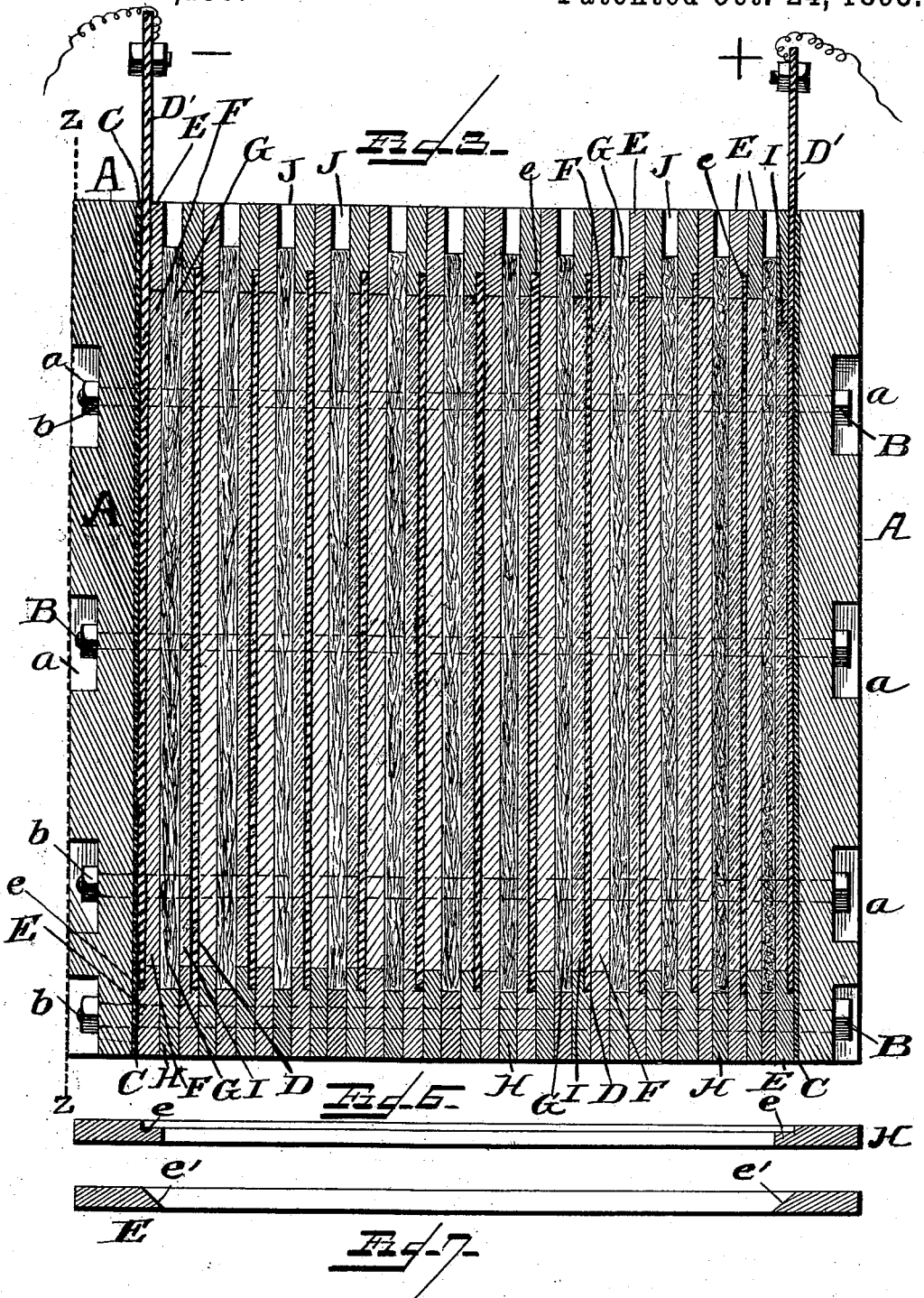

UNITED STATES PATENT OFFICE.

CHARLES W. KENNEDY, OF PHILADELPHIA, PENNSYLVANIA.

STORAGE-BATTERY.

SPECIFICATION forming part of Letters Patent No. 507,139, dated October 24, 1893.

Application filed October 19, 1892. Serial No. 449,415. (No model.)

*To all whom it may concern:*

Be it known that I, CHARLES W. KENNEDY, a citizen of the United States, and a resident of Philadelphia, in the county of Philadelphia and State of Pennsylvania, have invented certain new and useful Improvements in Storage-Batteries; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved storage battery. Fig. 2 is a plan or top view of the same. Fig. 3 is an enlarged view of the battery as this would appear in section on the vertical plane indicated by the broken line marked $x$—$x$ in Fig. 2. Fig. 4 is a perspective view of one of the non-conducting acid-proof frames used in building up my battery. Fig. 5 is a perspective view of one of the bibulous or absorbent plates used in my battery, with its soft rubber frame or gasket. Fig. 6 is a longitudinal sectional view of the frame shown in Fig. 4, on line $y$—$y$ in said figure; and Fig. 7 is a similar view, illustrating a slightly modified construction of said frame.

Like letters of reference denote corresponding parts in all the figures.

This invention relates to the particular type of batteries known as "storage batteries," "secondary batteries," "accumulators," and under various other names, *i. e.* batteries which remain inactive until "formed" and charged in any of the several well-known ways. Among the chief desiderata in batteries of that type are the following: As little weight as possible, compactness and solidity as to form and shape, durability, (both as regards the mechanical construction and the duration of the effective service,) ease in "forming" and "charging," simplicity of construction (permitting of its being easily taken apart and again assembled), provision for so placing or disposing the active material that it cannot fall out and drop to the bottom of the cell, preventing "buckling" of the plates, preventing short circuiting and—what is perhaps the most important requirement of all—the highest obtainable voltage as well as amperage. In storage batteries as heretofore constructed, in so far as these have come under my observation, there has been no great difficulty in increasing the number of ampères which the battery was to yield, simply by adding to the number of plates and "grids," so-called, and thus commensurately increase the dimensions and capacity of the battery; but no effective means appear to have been found for increasing the number of volts (voltage) in a similar manner.

Now, the object of my improvements is to meet the conditions and requirements above set forth, and, in addition thereto, build a battery in which the voltage may be regulated (*i. e.* increased or decreased at will) in substantially the same way in which the ampèrage is now controlled in secondary batteries; and with these objects in view, my invention consists in the construction and combination of parts of the storage battery or "pile" as will be hereinafter more fully described and particularly pointed out in the claims.

At the outset I may state, that my improved battery does not use a "cell," but consists of a single "pile" (which may be of any desired dimensions), having a single electrode at each end. Again, unlike most storage batteries intended for hard service (such as running street-car motors, elevators, or the like,) which are usually "wet," *i. e.* using a fluid electrolyte for the immersion of the plates, mine is practically a "dry" battery, as it contains no fluid which can leak or spill out. My battery differs in other important respects from storage batteries intended for the same class of work as now in use, which will be referred to at greater length hereinafter.

The construction of this battery will perhaps be best understood by describing the manner in which it is built up, or its parts assembled; and this will be readily understood by reference to Fig. 3, Sheet 2; the sheet being held sidewise with the electrodes pointing to the left.

Let the dotted line marked $z$—$z$, represent the flat horizontal top of a table or workbench; on this I place a flat rectangular board, A, of suitable size and thickness, according to the dimensions of the battery. This board or foundation (which will form one of the sides, or ends, of the finished battery) may be made of wood, papier maché or any other suitable substance; wood if properly seasoned and treated with wax or paraffine, will answer the purpose very well, as it is cheap, comparatively light, and easily cut and planed to the desired size and shape. On the under side, i. e. the side resting on the table, the board A has recesses $a$, cut into it, to receive the nuts $b$ of the binding-bolts B, which will be referred to later on. On this board or foundation A I place a thin sheet, C, of hard rubber, celluloid, or other insulating material, cut to the same size as the board, so as to fully cover the same on one side. On this again is placed the first electrode, D', which is a thin sheet of metallic lead, the edges of which, except on one side where it is extended beyond the body of the battery, are fitted into the rabbet $e$ of a frame E, of celluloid, hard rubber, or other non-conducting, acid proof material. As will be seen by reference to Figs. 4, 6, and 7, this frame is in a single piece, with a rectangular opening or "light" in the middle for the insertion of a thin lead plate, the edges of which are fitted into the rabbet or recess $e$ around the central opening. But instead of making frame E with such an inside rabbet, the inner side of the opening may simply be beveled off, as shown at $e'$ in Fig. 7, in which case as I shall explain presently, the bevel $e'$ simply answers the same purpose as the offset or rabbet $e$.

I prefer, in the building of my battery, to have each frame E, with its metallic lead-plate and filling of "active material" (red lead and litharge, for example), already "pasted" and ready to hand, so that, in building, the pile is formed by alternate layers of these pasted frames and bibulous absorbent plates. Thus, referring now again to Fig. 3, we have a layer of active material, viz: red lead F, covering the metallic lead plate D; and upon this is placed a rectangular sheet of asbestus, felt, or other absorbent material, G, which is confined on three sides by a frame or gasket, H, of soft-rubber, as shown more clearly in Fig. 5, so as to leave the edge of the asbestus or felt packing, G, exposed at the upper side; with the sides of the frame or gasket H extending a short distance above the asbestus pad. Upon this, again, I place one of the celluloid frames, E, the middle lead plate D of which is covered on one side with a coating of litharge, I, and on the other side with a coating of red-lead F, so that that side of the frame and plate which faces the asbestus pad G will be coated with the litharge, the litharge covering pressing against the asbestus. Thus, in building up my pile or battery, I use alternately an absorbent pad or an electrolyte pad, G, with its appropriate soft-rubber frame or gasket encircling it on three sides, and an "active section," as I call it, comprising two of the frames E placed one upon the other, with a thin metallic lead-plate, D, held between them; said plates being covered or coated on one side with a layer, equal in thickness to the thickness of frame E, of one kind of active material, as litharge, for example, and on the other side with a layer of some other kind of active material, as red-lead or minium, for example, of equal thickness, i. e. equal to the thickness of the frame on that side. The object of the rabbet or bevel in the frame E is to make room for the thickness of the lead-plate and hold it in place, so that it cannot drop out when the plates or "active sections" are being pasted (i. e., covered with red lead on one side and litharge on the other) and handled in building up the battery.

In Fig. 3, I have shown a battery of my construction containing, or built up by, eleven of these "active sections"—not counting the end electrodes D' and $D^2$—and twelve absorbent "electrolyte pads" interposed between and separating them effectively from one another. The sections are prepared or pasted beforehand so as to be ready for use, and the building up of the battery or pile consists in simply placing these one upon the other in alternate layers, until a battery of the desired size and capacity has been attained. The pile is then finished by placing on top another sheet of hard rubber or other insulating material, C, on top of which again the other board or cover, A, is placed, after which the whole pile is firmly bound together to form a solid and compact structure by means of the nutted binding-bolts or tie-rods B. These are inserted longitudinally through bolt-holes in the side-pieces or casing boards A A, and through corresponding holes bored through the celluloid frames E and soft-rubber gaskets H; but in no case do these bolts or tie-rods touch either the metallic lead-plates or the coatings of red lead and litharge of these plates, nor do they come in contact with the absorbent pads G, so that short circuiting by way of the bolts used for connecting the sections is absolutely impossible, whereas, in most storage batteries, these bolts which hold the grids together are a frequent source of short circuiting.

We have seen that the sides of the soft-rubber gaskets H extend up above the top of the pad of bibulous or absorbent material G which it surrounds, so as to leave an open space or top. When these pads are placed in the battery in juxtaposition to the "active sections" which they separate, a series of shallow rectangular chambers or cells, J, will be formed in the top of the battery, parallel to one another and separated by dividing walls formed by the upper ends of the frames E arranged in pairs. These cells are filled with the acid solution which is to form the electrolyte, which is rapidly absorbed by the porous pads G; the cells being kept filled until the pads have become saturated with electrolyte. It will thus be seen that the absorbent pads, charged with solution, take the place of the usual fluid electrolyte, and that there can be no spilling or leakage of fluid. It will also be seen that I use no cell; the boards or casing A A covering only two of the sides of the battery, while the two remaining sides, as also the bottom, are formed by the closely connected frames E (of which there is a pair for each active section) and the soft-rubber frames H interposed contiguously between them, and here comes in an important function of these soft-rubber frames or gaskets, which is this, that not only do these gaskets serve to form the electrolyte cells, J, but they form an elastic and fluid proof packing between the sections of which the pile or battery is built up, so that, by tightening up the nuts on the tie-rods B, the section frames and gaskets are pressed so firmly against one another and tied so solidly together that the whole structure will form a compact square or rectangular block, which may be placed in any position, and even turned upside-down, without interfering with its working. Another important advantage which results from this combination is this, that the interposed soft-rubber frames or gaskets make allowance for contraction or expansion of the battery or pile in the direction of its length, thus preventing any tendency to buckle or warp. In fact, as the lead-plates with their coatings of active material are separated by the absorbent pads interposed between and pressed up close against them, buckling of the plates is impossible, as is also the displacement or dropping off of the active material with which the lead plates are covered, which is held in place by being pressed firmly from both sides up against the lead plate or backing by the smooth sides of the absorbent pads which face the active material on both sides. Thus, one of the greatest annoyances in accumulators, viz: the scaling or dropping off of the active material from its metallic lead-supports is absolutely and entirely obviated.

The plates $D'$ and $D^2$, at opposite ends of the pile constitute the electrodes and are extended beyond the body of the pile and provided with binding-nuts and screws, as usual, for the attachment of the conductor wire. The power or electro motive force of the battery is determined by the number of "active secions" employed; thus by adding to or subtracting from the pile, the voltage may be regulated at will and with absolute certainty and economy. The absence of a cell to contain the battery plates not only reduces the size as well as the weight of the battery, but it lessens the expense and the liability to breakage. When the absorbent pads become too dry to render effective service, they can readily be re-charged with electrolyte simply by filling the cells J and letting the pads absorb, by degrees, all they will hold; and whenever it is desired to renew either the pads or the active sections, this can easily be done by loosening the nuts of the tie-rods and withdrawing them from the casing, when the pile will come apart,—to be as easily assembled again by re-inserting the bolts and tightening-up the nuts within the nut-recesses $a$.

It will be obvious that where I mention, as materials used in the construction of my battery, celluloid, hard-rubber, soft-rubber, litharge, asbestus, red-lead, &c., I do not mean to confine myself to these substances, which are merely given as examples for which there are well-known equivalents, which, of course, I may use instead of the substances named, if I prefer to do so.

Having thus described my invention, I claim and desire to secure by Letters Patent of the United States—

1. A dry storage battery comprising a pile of active sections constructed as set forth and separated from one another by pads of absorbent material adapted to be charged with an electrolyte and having a soft-rubber gasket, in combination with the electrodes $D'$ and $D^2$, the casing or compressing boards A A, and the binding-bolts or tie-rods inserted through said boards, and passing through the frames of the active sections and the gaskets of the electrolyte pads; substantially as described.

2. In a storage battery, an "active section" consisting of a frame of non-conducting acid-proof material, and a plate of metallic lead confined within said frame and coated on one side, to the thickness of the frame, with red-lead, and on the opposite side, also to the thickness of the frame on that side, with a layer of litharge, substantially as described.

3. The "active section" for storage batteries herein shown and described, the same consisting of a rabbeted frame of celluloid or other suitable material, an inside plate of metallic lead fitting in the rabbet, and confined by a similar frame placed over it, a layer of red-lead or minium placed within the double frame on one side of the lead plate, and a layer of litharge placed within the double frame on the other side of the central lead-plate; substantially as set forth.

In testimony that I claim the foregoing as my own I have hereunto affixed my signature in presence of two witnesses.

CHARLES W. KENNEDY.

Witnesses:
AUGUST PETERSON,
EMMA M. GILLETTE.